US00RE36535E

United States Patent [19]

Hicks

[11] E Patent Number: Re. 36,535

[45] **Reissued Date of Patent: *Jan. 25, 2000**

[54] METHOD OF PRODUCING PHOTOGRAPHIC PRINTS

[76] Inventor: Ray Hicks, 4444 W. Bristol Rd., Flint, Mich. 48507

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,825

[22] Filed: Jan. 13, 1997

Related U.S. Patent Documents

Reissue of:

[64] Patent No.: 5,512,396
Issued: Apr. 30, 1996
Appl. No.: 08/270,444
Filed: Jul. 5, 1994

[51] Int. Cl.[7] ..... H04N 1/00

[52] U.S. Cl. ..... 430/21; 355/40; 355/77; 358/527; 396/1; 396/429

[58] Field of Search ..... 430/21; 355/40, 355/77; 358/527; 396/1, 429

[56] References Cited

U.S. PATENT DOCUMENTS

| | | | |
|---|---|---|---|
| 4,694,354 | 9/1987 | Tanaka et al. | 358/296 |
| 4,716,470 | 12/1987 | Levine | 358/256 |
| 4,841,359 | 6/1989 | Hawkins et al. | 358/76 |
| 4,862,200 | 8/1989 | Hicks | 354/75 |
| 4,951,086 | 8/1990 | Hicks | 355/41 |
| 5,043,758 | 8/1991 | Nealon | 355/40 |
| 5,072,256 | 12/1991 | Hicks | 355/71 |
| 5,101,286 | 3/1992 | Patton | 358/487 |
| 5,121,198 | 6/1992 | Maronian | 358/76 |
| 5,477,353 | 12/1995 | Yamasaki | 358/527 |

*Primary Examiner*—John A. McPherson
*Attorney, Agent, or Firm*—Young & Basile, P.C.

[57] ABSTRACT

A methodology for handling photographic film in which a video image of each frame of film is acquired on a diskette as the frames are originally being processed in the photographic laboratory, the diskette is transmitted to the photographer's studio, along with the proof prints, for viewing by the photographer/subject, the photographer/subject makes further desired corrections or adjustments of each frame by viewing the video image of each frame on a computer monitor, the farther corrections or adjustments are recorded on the diskette for each frame, and the revised diskette is returned to the photographic laboratory where it is used in conjunction with the film to produce final photographic prints. The final photographic prints thus graphically and objectively reflect the precise desires of the photographer/subject.

10 Claims, 2 Drawing Sheets

METHOD OF PRODUCING PHOTOGRAPHIC PRINTS

Matter enclosed in heavy brackets [ ] appears in the original patent but forms no part of this reissue specification; matter printed in italics indicates the additions made by reissue.

BACKGROUND OF THE INVENTION

This invention relates to methodology for handling photographic film and more particularly to a methodology for producing final photographic prints from exposed photographic film.

In a common photographic process, encountered for example in scenarios involving portrait, wedding, and commercial photographic assignments, a series of photographs are taken in a photographic studio, the exposed film is sent to a photographic laboratory, the film is developed in the laboratory, the film is put through an editing and analyzing process to perform corrections with respect to each frame of the film, a proof of each flame is made at the photographic laboratory utilizing the corrections developed during the editing and analyzing process, proofs are sent back to the photographer's studio where the photographer, typically in conjunction with the subject or subjects, views the proofs, and the proofs and then sent back to the photographic laboratory with or without instructions with respect to further corrections to be made to each frame before the final printing of the final photographic prints.

The correction instructions sent back to the photographic laboratory from the photographer's studio may be verbal or written but, in either event, they must be interpreted by the personnel in the photographic laboratory so as to perform the desired correction as to each frame of the film before the final prints are made. This interpretation of the corrections is necessarily a subjective process and as such is subject to considerable error in the sense that the photographer/customer's precise wishes are not carried out in the course of producing the final photographic prints.

SUMMARY OF THE INVENTION

This invention is directed to the provision of an improved method of processing photographic film.

More specifically, this invention is directed to the provision of an improved method for processing photographic film in which corrections proposed by the photographer's studio and/or the photographic subjects are provided to the photographic laboratory in precise, objective form.

According to the invention, exposed film including at least one frame is provided; the exposed film is developed; a video image is acquired of the frame of developed film at a first work station and the video image is stored; the video image of the frame is displayed at a subsequent work station utilizing the stored video image; corrections are performed with respect to the frame utilizing the video image and the corrections are stored; and photographic prints are produced utilizing the stored corrections. This methodology, in a scenario where the first work station is a photographic laboratory and the subsequent work station is a photographic studio, provides a means of conveying desired corrections back to the photographic laboratory from the photographer's studio in a precise objective format so as to ensure that the final photographic prints produced at the photographic laboratory accurately reflect the corrections desired by the photographer/customer.

According to a further feature of the invention, the video image is stored on a storage device, the storage device is transported to the subsequent work station for use in displaying the video image at the subsequent work station, the corrections performed at the subsequent work station are stored on the storage device, and the storage device is transported to the first work station for use in producing prints. This arrangement allows a storage device; such as a diskette, to be transported between a photographer's laboratory and a photographer's studio to facilitate the making of corrections at the photographer's studio and to ensure that the corrections made at the photographer's studio are accurately conveyed to the photographic .laboratory for use in producing the final photographic prints.

According to a further feature of the invention, the methodology includes the further step of providing a print of the video image at the photographer's studio work station utilizing the stored corrections. This methodology ensures that the corrections entered at the photographer's studio will produce prints with the characteristics desired by the photographer/customer.

According to a further feature of the invention, the methodology includes the further step of providing a proof print of each frame at the first work station and transporting the proof print to the subsequent work station. This methodology, whereby a proof print of each frame may be transported from the photographer's laboratory to the photographer's studio allows the proof print to be utilized in conjunction with the video image of each frame to facilitate analysis of each frame at the photographer's studio to determine the desired further corrections for each frame.

DETAILED DESCRIPTION OF THE PREFERRED EMBODIMENT

Figure 1:
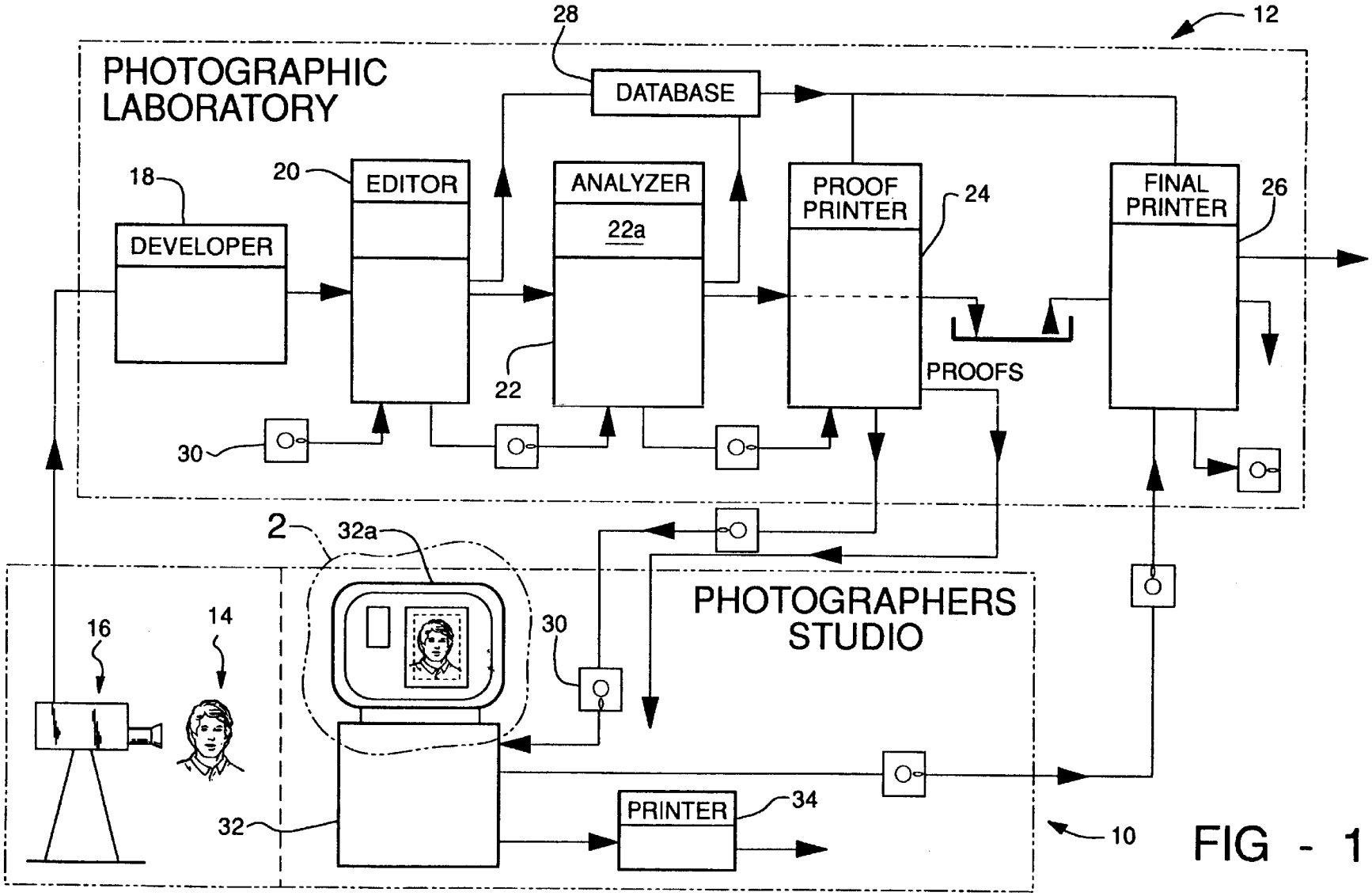
FIG. 1 is a flow diagram illustrating the invention methodology as applied to a photographic process involving a photographer's studio and a photographic laboratory.
Figure 2:
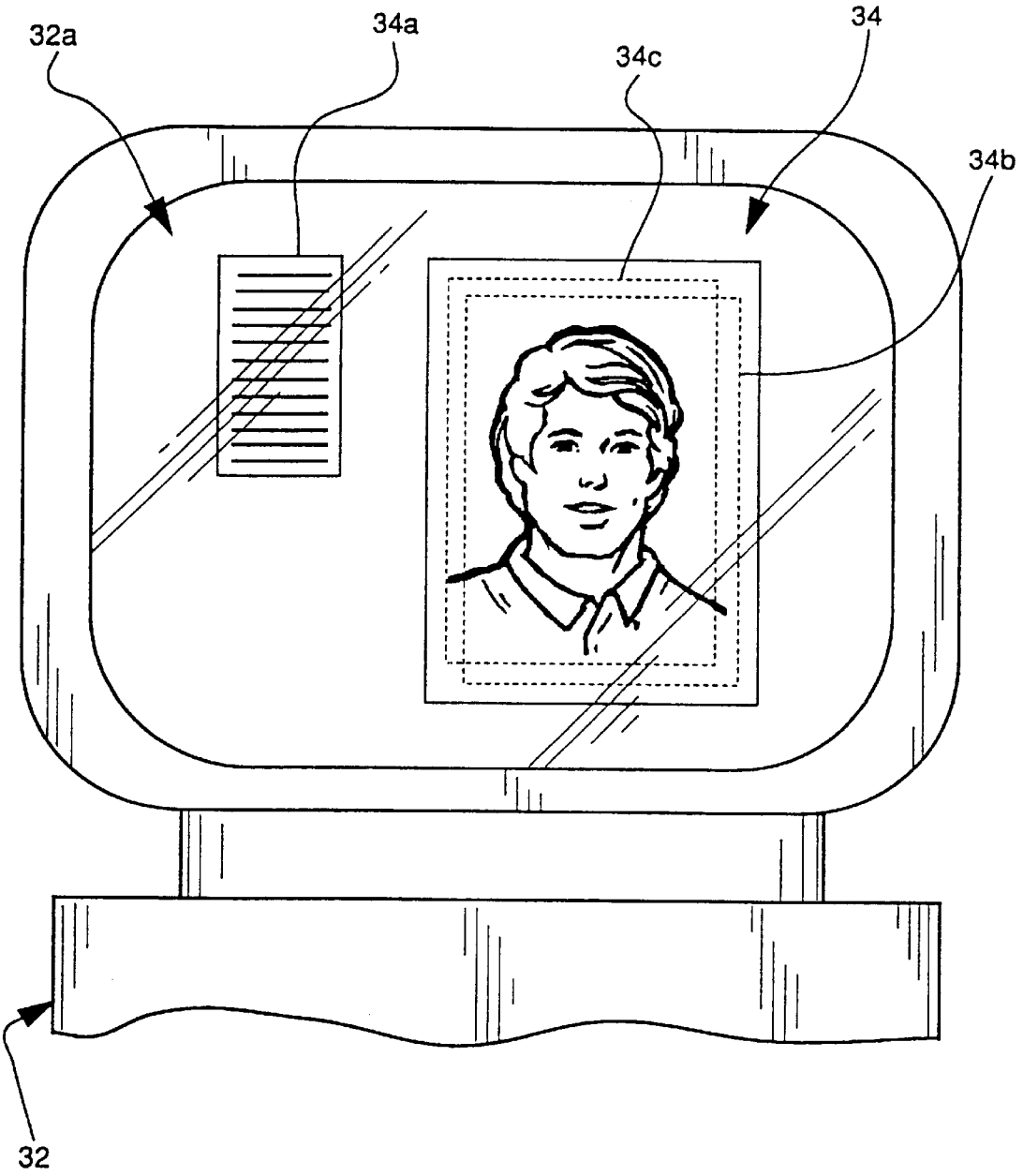
FIG. 2 is a detail view taken within the circle 2 of FIG. 1.

The invention methodology is illustrated in FIG. 1 in association with a photographic process involving a photographer's studio 10 and a photographic laboratory 12.

More specifically, the invention is illustrated in FIG. 1 in association with a photographic process (for example, portrait, wedding, or commercial) wherein a subject or subjects 14 are posed in the photographer's studio 10, a series of pictures is taken of each subject utilizing a camera 16, the exposed film is sent to the photographic laboratory 12 where the film is developed, edited and analyzed, a series of proof prints are made at the photographic laboratory, the proof prints are sent to the photographer's studio where they are reviewed by the photographer, typically with the assistance of the subject to select the desired proofs as well as order information with respect to each proof, and the proofs are returned to the photographic laboratory for use in producing the final photographic prints.

The photographic laboratory 12 may include, for example, a developer 18, an editor 20, an analyzer 22, a proof printer 24, a final printer 26, and a database 28. Although it is possible to process individual frames of film at the photographic laboratory 12, more typically one or more rolls of film are developed at the developer 18 and these multiple rolls are spliced together to form a roll or batch of work to be done. The film in the batch may all be from one photographer or may be from many photographers. The spliced and developed film is then edited.

In the editing process the film is viewed frame-by-frame in the monitor 20a of the editor and the cropping of each frame is selected by adjusting the frame along X and Y axes and, if necessary, rotating the frame. Print selections are also made at this time. Further, during this editing operation, each frame of the film is marked. The marks are used to index the film automatically. These marks are encoded in such a way that random access to any edited frame is possible. This method allows the automated devices to handle the film through the entire process. The marking is also used to link the data specified at the time it was edited to the frame that was edited.

Also parallel to the process of editing and marking the film, and according to an important feature of the invention, the film image is grabbed by a video system, stored and indexed in such a way that it can be retrieved for the batch of film being processed either sequentially or randomly. The video image of each frame is preferably grabbed utilizing a diskette 30 of known form which is suitably positioned in the editor 20 in known manner during the editing process so as to digitally record an image of each frame of film processed by the editor. Specifically, after each frame has been adjusted for X and Y axes and rotation and after print size selection has been made, this information is stored on the diskette. At the same time, this information is also stored in data base 28.

The edited film is now transported to the analyzer 22 and, simultaneously the diskette 30 is removed from the editor 20 and suitably positioned in the analyzer 22.

The analyzing process involves displaying the image of each frame upon a calibrated video screen or monitor 22a whereafter adjustment is made with respect to the color and density of each image. The values of the adjustments made are in standardized units that can be recorded and used later to control the color and density of the photographs to be produced. This information is stored on the diskette 30 and is further stored in data base 28 with each frame or film in each case being catalogued to the data base by the marking on the film.

The edited and analyzed film is now transferred to the proof printer 24 and diskette 30 is positioned in the proof printer. The proof printer 24 utilizes information from database 28 as well as information from diskette 30 to produce proof prints corresponding to each frame of the film. Each proof is preferably marked with information to make it possible to relocate the data used to produce the photograph. This information will indicate the batch, and the frame of the batch, from which it was produced and may be provided on the front or the rear of the photographic print. The information may be in human readable form, machine readable form, or both at the photographers or labs election.

It will be understood that the proof prints made by the proof printer 24 are utilized by the photographer and customer in the sales process to determine which of the proof images they would like to order for final prints as well as the sizes and number of prints to be ordered.

According to the invention, the proofprints are sent to the photographer's studio along with the corresponding diskette 30 containing the electronic digital video image information with respect to the film frames corresponding to the proof prints being sent to the photographer's studio. The photographer uses the proof prints and diskette as a sales tool to show the customer what they have available to order from. Normally upon receipt of the proof prints from the lab, and according to the prior art, the photographer does manual cropping using template or aperture cards and manual transcription of the order placed by the customer. According to the invention, this process is done electronically using the diskette and proof print supplied to the photographer from the laboratory. This automates the process, organizes it, and reduces it to a graphical objective exercise.

The photographer preferably follows a program which is supplied with the diskette and which enables the photographer to preform all of the processes that have previously been performed manually. Specifically, the photographer loads the diskette containing the video digital image to a computer 32 located at the photographer's studio and including a monitor 32a. The computer is equipped with a program which will allow the photographer to specify which images are to be worked on. This is done by the data marked on the photographs at the time of production of the proof prints. The computer fetches the electronic image information from the diskette 30 for each frame and displays the appropriate video image or display 34 on the monitor 32a. Video image display 34 contains an information box 34a specifying the parameters under which the image is produced as well as the batch and the frame of the batch that is being viewed. Display 34 will also indicate the cropping that was used to produce the image by displaying a parameter or window line 34b within the image area. The program will prompt the photographer to do tasks in a specific order to achieve the maximum throughput and organize the activities that are to take place. In this scenario, the photographer first selects the cropping by selecting a preprogrammed key to view the alternative selections that are available.

As previously indicated, the original cropping is displayed by the window line 34b. If this original cropping is acceptable, the photographer goes on to the next step which would be positioning of the cropping. Positioning of the cropping is accomplished by use of cursor keys which allows the cropping window to be moved in X and Y directions and/or rotated around the center of the crop window. This rotational movement can be specified as vertical or horizontal which will cause the window to rotate 90 degrees relative to the current position. The rotation may also be specified in smaller units (less than 90 degrees). This adjusts for the photographer's camera being out of square. Once the crop position is established, for example by establishing a new crop or window line 34c, corrections with respect to color or density may be made. Corrections to the color or density are made interactively by predefined keys which allow the operator to make the displayed image warmer, make the color darker or lighter, or change the color via keys for cyan, magenta, yellow, red, green and blue. These key values relate directly to the production process which is going to take place at the lab and serve as bias to the base color parameters that were originally used to produce the proof print and that were originally encoded on the diskette 30. The program is also used to allow for the specification of the quantities and print sizes to be produced. For example, the operator may specify that an 11×14, two 5×7's, and 4 wallet size photographs may be produced of a given frame.

When the photographer is finished specifying the parameters, the session is terminated for each particular frame and the information with respect to the frame is recorded on the diskette 30. This interactive process continues on frame-by-frame basis for the frames or images that have been selected by the customer. Once the necessary iterations are complete the information on diskette 30 is conveyed to the laboratory and may be utilized in conjunction with the film to produce the final photographic prints.

The invention envisions that the film may be sent to the photographers studio along with the diskette and the proof prints or, alternatively, may be stored at the photographic laboratory for use in making the final prints when the diskette is returned. If the film is stored at the laboratory, the laboratory establishes a library and the film is catalogued by the batch number so that it will be readily retrievable for future use. In either event, the film is utilized to produce the final photographic prints utilizing final printer 26.

The photographer's studio may further include an ink jet printer 34 coupled to the computer 32 which may be utilized at any time to produce a print corresponding to the image displayed on the monitor 32a. The print 34 may be utilized to give the customer a "receipt" to show the characteristics of the prints that are being ordered. Once the diskette 30 embodying the corrections made at the photographers studio is received back at the laboratory it may be utilized in conjunction with the final printer 26 to produce the final photographic prints. Stored information from data base 28 may also be utilized in the production of the final photographic prints. Typically, a combination of stored information as to each frame from the database 28 and from the diskette 30 is utilized to instruct the final printer in the production of the final prints.

The final printer 26 is equipped in known manner with an automated film transport mechanism which allows for the positioning of the frames of film according to the marking on the film provided when the film was originally edited. This marking is utilized in conjunction with the additional information gathered during the correction process that took place at the photographers studio. The printer's film transport mechanism is capable of reproducing the positioning data for X, Y and rotations. This information was specified and the information conveyed from the photography organization under the direction of the supervising computer system. The printer is equipped with an exposure gate aperture mechanism and control system which allows for the gates and dimensions to be changed in accordance with the cropping gate aperture dimension. These dimensions were specified by parameters made available to the photography organization for the sizes of cropping gates and selected by the photography organization at the time the cropping was established on the computer program. The printer is also equipped with a mechanism that will control the masking of the photographic paper to allow for the appropriate size image to be produced without waste of material; may also be equipped with a marking device to identify the photographs that are made for the information given to allow for the orderly return of the finished products to the photography organization; and is further equipped with a light source capable of being programmed or controlled in such a way as to allow for variance in the exposure coefficient.

The computer controlling the printer will access the information conveyed. From this information it will move the film transport to a specified frame and exposure gate corresponding to the parameters given by the photography organization for the X and Y axes relative to the original position specified when originally edited at the photographic laboratory. The computer also directs or controls the operation of the automatic cropping aperture to change dimensions to the value required by the selection made at the photographer's studio; controls or directs the operation of a rotation actuator for the positioning of a negative; controls any deviation in rotation specified from the normal position for the horizontal or vertical position as specified from the photographer's studio; selects the appropriate lens to produce the magnification required for a given print size; selects additional lenses to meet the requirements of the order for combination size orders; operates mechanisms controlling the paper mask aperture to produce the appropriate size photograph as specified; calculates for the parameters given; stores the correct exposure coefficients; and controls the lamp house and other exposure control means to produce the photographic image with the results specified from the information given.

As an alternative to the methodology described wherein the diskette 30 is utilized to convey the editing and analyzing information with respect to the film frames from the photographic laboratory to the photographer's studio and then back to the photographic laboratory, the same information may be modemed back and forth between the laboratory and the studio using existing phone systems.

The invention methodology will be seen to provide a precise graphical means of conveying the desires of the photographer/customer with respect to each frame of film back to the photographic laboratory so that the final printing operation in the laboratory will precisely reflect the desires of the photographer/customer, as compared to prior art methodology wherein the photographer/customers desires were only subjectively and imprecisely incorporated in the production of the final photographic prints.

Whereas a preferred embodiment of the invention has been illustrated and described in detail it will be apparent that various changes may be made in the disclosed embodiment without departing from the scope or spirit of the invention.

I claim:

1. A method of producing photographic prints comprising the steps of:

providing exposed photographic film including at least one frame;

developing the exposed film frame;

acquiring a video image of the frame of developed film at a first work station and storing the video image;

making initial corrections with respect to the frame of developed film at the first work station and storing the initial corrections along with the video image;

displaying the video image of the frame at a subsequent work station utilizing the stored video image and the stored initial corrections;

performing further corrections at the subsequent work station with respect to the frame utilizing the video image [including corrections modifying the initial corrections,] and storing the further corrections; and producing photographic prints at the first work station utilizing the stored initial and further corrections.

2. A method according to claim 1 wherein:

the prints are produced from the developed film.

3. A method according to claim 1 wherein:

the video image and initial corrections are stored on a storage device and the storage device is transported to the subsequent work station for use in displaying the video image at the subsequent work station; and the further corrections are also stored on the storage device and the storage device is transported to the first work station for use in producing prints.

4. A method according to claim 1 wherein:

the first work station comprises a photographic laboratory work station;

the subsequent work station comprises a photographer's studio work station remote from the photographic laboratory work station; and the photographic prints are produced at the photographic laboratory work station.

5. A method according to claim 4 wherein:

the method includes the further step of providing a print of the video image at the photographer's studio work station utilizing the stored initial and further corrections.

6. A method according to claim 1 wherein:

the method includes the further step of providing a proof print at the first work station and transporting the proof prints to the subsequent work station.

7. A method of producing final photographic prints from exposed film including a plurality of frames, the method comprising the steps of:

developing the exposed film at a photographic laboratory;

acquiring a video image of each frame of developed film at the photographic laboratory and storing the video images;

making initial corrections with respect to each frame of the exposed film at the photographic laboratory and storing the initial functions;

providing a proof print of each frame at the photographic laboratory;

transporting the proof prints to a photographer's studio remote from the photographic laboratory;

displaying the video image of each frame, including the initial corrections, at the photographer's studio;

performing further corrections at the photographer's studio with respect to each frame utilizing the video image and storing the further corrections; and producing final photographic prints at the photographic laboratory utilizing the stored corrections.

8. A method according to claim 7 wherein:

the proof prints and the final prints are produced from the developed film.

9. A method according to claim 8 wherein:

the video images and the initial corrections are stored on a storage device and the storage device is transported to the photographer's studio along with the proof prints; and the further corrections are stored on the storage device and the storage device is transported back to the photographic laboratory for use in producing the final photographic prints.

*10. A method according to claim 1 wherein the step of performing further corrections at the subsequent work station with respect to the frame utilizing the image includes performing corrections modifying the initial corrections.*

* * * * *